United States Patent [19]

Hasegawa et al.

[11] Patent Number: 5,631,105
[45] Date of Patent: May 20, 1997

[54] NON-AQUEOUS ELECTROLYTE LITHIUM SECONDARY BATTERY

[75] Inventors: Masaki Hasegawa, Hirakata; Yasuhiko Bito, Minamikawachi-gun; Shuji Ito, Akashi; Toshihide Murata, Izumiotsu; Yoshinori Toyoguchi, Yao, all of Japan

[73] Assignee: Matsushita Electric Industrial Co., Ltd., Osaka, Japan

[21] Appl. No.: 651,365

[22] Filed: May 22, 1996

[30] Foreign Application Priority Data

| May 26, 1995 | [JP] | Japan | 7-128076 |
| Jul. 14, 1995 | [JP] | Japan | 7-178781 |
| Apr. 4, 1996 | [JP] | Japan | 8-082610 |

[51] Int. Cl.$^6$ .............. H01M 4/52; H01M 10/40
[52] U.S. Cl. .............. 429/194; 429/218; 429/223; 423/594
[58] Field of Search ............ 429/194, 218, 429/223, 209; 423/593, 594, 595, 596, 600; 420/900

[56] References Cited

U.S. PATENT DOCUMENTS

| 4,770,960 | 9/1988 | Nagaura et al. | 429/194 |
| 5,264,201 | 11/1993 | Dahn et al. | 423/594 |
| 5,308,720 | 5/1994 | Kurokawa et al. | 429/223 X |
| 5,494,762 | 2/1996 | Isoyama et al. | |

FOREIGN PATENT DOCUMENTS

| 0468942A2 | 1/1992 | European Pat. Off. . |
| 0696075A2 | 2/1996 | European Pat. Off. . |
| 0702421A1 | 3/1996 | European Pat. Off. . |
| 0704921A1 | 4/1996 | European Pat. Off. . |
| 0712172A2 | 5/1996 | European Pat. Off. . |
| 3-201368 | 9/1991 | Japan . |
| 5-54889 | 3/1993 | Japan . |
| 7-235293 | 9/1995 | Japan . |

*Primary Examiner*—Anthony Skapars
*Attorney, Agent, or Firm*—Panitch Schwarze Jacobs & Nadel, P.C.

[57] ABSTRACT

A non-aqueous electrolyte secondary battery having a low manufacturing cost and a high energy density and being excellent in the high rate charge/discharge characteristic and in the characteristics in operation at high temperature provided by an improvement on its positive electrode active material is disclosed. The positive electrode active material comprises a specific compound wherein a part of nickel or lithium in $LiNiO_2$ is substituted with another element in a specified range. The element for the substitution comprises Mg, Ca, Sr, Ba, Al Cr, B and Co which may be employed solely or in combination.

6 Claims, 1 Drawing Sheet

NON-AQUEOUS ELECTROLYTE LITHIUM SECONDARY BATTERY

BACKGROUND OF THE INVENTION

1. Field of the Invention

The present invention relates to a non-aqueous electrolyte lithium secondary battery, particularly, to a positive electrode active material for the same.

2. Description of the Prior Art

Non-aqueous electrolyte secondary batteries comprising a lithium or a lithium compound negative electrode are highly promising as the power source for driving cordless electronic as well as electric appliances because they generate a high voltage, providing a high energy density, and therefore, there have been various vigorous studies in the literature.

As the positive electrode active material for the non-aqueous secondary batteries, there have hitherto been proposed transition metal oxides and chalcogen compounds such as $LiCoO_2$, $LiMn_2O_4$, $LiFeO_2$, $LiNiO_2$, $V_2O_5$, $Cr_2O_5$, $TiS_2$, $MoS_2$ and the like. These compounds have a layered structure or a tunnel structure of a crystal capable of absorbing or desorbing (intercalating or deintercalating) lithium ions in a reversible manner. In particular, $LiCoO_2$ and $LiNiO_2$ are attracting attention in this field of art as the positive electrode active material for a 4 V class non-aqueous electrolyte lithium secondary battery.

Of these compounds, realization of the practical use of $LiCoO_2$ is under progress because it has a regular and layered structure and can demonstrate a high discharge voltage and a high capacity. Cobalt is, however, a costly element requiring a high manufacturing cost. Moreover, there is a concern about a possible insufficient supply, and a sudden rise in price due to the sudden change in the tense world situation, particularly in the global market. Under these circumstances, $LiNiO_2$, which is relatively low costly element and can generate a higher capacity exceeding $LiCoO_2$, is now attracting attention in this field of art, and thus researches and developments are briskly conducted on $LiNiO_2$ for realizing its practical use. $LiNiO_2$ has a composition and a structure similar to those of $LiCoO_2$ and thus a promising material as the positive electrode active material for the lithium secondary batteries to provide a high discharge voltage and a high capacity. With the researches and developments up to the present, the method for synthesizing the same has been improved, and thus a material of superior quality which can demonstrate a high capacity is now available with ease.

As described previously, although the $LiNiO_2$ has been improved to have a higher initial capacity than that of $LiCoO_2$, there remains much to be solved in other characteristics. When charging and discharging is performed at a deep depth in order to obtain a large capacity in particular, a serious decrease is created in the lattice constant of the $LiNiO_2$ and a heavy contraction of the volume of the crystal lattice occurs accordingly. As a result, cracks or cleavages may develop in the particles of the active material and a default is sometimes created in its current-collecting performance, thereby to cause a decrease in the capacity. Further, since such great change occurs in the crystal lattice, a disorder is created in the crystal structure, thereby to trigger a serious deterioration in the capacity of the active material itself. That is, it is believed that when lithium ions are extracted from the crystal in a large quantity during the charging process, the crystal lattice becomes unstable to trigger a rearrangement of the ions in the crystal lattice and the layered structure is disordered, thereby to prevent the lithium ions from diffusing desirably in the crystal and deteriorate the characteristics.

As described previously, $LiNiO_2$ as the positive electrode active material for the lithium secondary batteries is characterized by its highly excellent initial discharge capacity but lacks a favorable cycle characteristic. The deterioration in the cycle characteristic can be suppressed to a reasonably small degree if only charging and discharging is repeated at a small capacity by selecting a shallow charging depth. If the $LiNiO_2$ is applied as the positive electrode active material having a higher capacity than $LiCoO_2$, there is a need to control its crystal structure and suppress the contraction in the crystal lattice and the disorder in the ion arrangement which may occur by a deep depth charging.

A method for controlling the crystal structure includes a substitution of a part of the nickel in the compound with another element. A report on the study appearing in Solid State Ionics, 53–56 (1992), pp. 370–375 describes a result of an attempt to improve the cycle characteristic of $LiNiO_2$ by substituting a part of the nickel in the compound with another element such as Co.

However, the characteristics of $LiNiO_2$ as the positive electrode active material for the lithium secondary batteries have not been improved enough, and the charge/discharge characteristic at a high rate and the cycle characteristic at high temperature remain unsatisfactory, in addition to the above-mentioned cycle characteristic at room temperature. Further, in the case of substituting a part of Ni with Co or the like, the cycle characteristic at room temperature is improved but the cycle characteristic at high temperature remains not satisfactory. If the battery is used as the power source for cordless appliances, rapid charging or large current discharging is sometimes required, and thus poor charge/discharge characteristics and the decrease in the discharge capacity by charging and discharging at a high rate become disadvantageous from the practical point of view.

Moreover, since the temperature inside the lithium secondary battery is elevated by large current discharging, an inconvenient restriction may be imposed on the conditions for using the battery if the high temperature characteristics are poor. For instance, the inconvenience is such that the battery cannot be charged immediately after a high rate discharging process. For this, it is important to effectively suppress the deterioration in the characteristics during the operation at high temperature.

SUMMARY OF THE INVENTION

The primary object of the present invention is to provide a non-aqueous electrolyte lithium secondary battery which is excellent in the high rate charge/discharge characteristics.

Another object of the present invention is to provide a non-aqueous electrolyte lithium secondary battery which is excellent in the charge/discharge characteristics at high temperature.

The present invention is based on a finding that in the non-aqueous electrolyte lithium secondary battery comprising a positive electrode, a negative electrode capable of absorbing and desorbing lithium in a reversible manner and a non-aqueous electrolyte, its high rate charge/discharge characteristic and its high temperature charge/discharge characteristic can greatly be improved by employing, as its positive electrode active material, a specific compound wherein a part of nickel or lithium in $LiNiO_2$ is substituted with another element.

The present inventors have found that by substituting a part of nickel in $LiNiO_2$ with an element selected from the group consisting of Mg, Ca, Sr and Ba, which are alkaline earth metals and produce bivalent ions, and by stabilizing the crystal skeleton of $LiNiO_2$, the high rate charge/discharge characteristic is greatly improved, in addition to the cycle performance.

In a detailed investigation on trivalent ions, the present inventors have further found that the high rate charge/discharge characteristic of $LiNiO_2$ can be improved if Al or Cr, transition elements belonging to the first colloary, is used in a small quantity. Based on these findings, the battery can be improved to have a high capacity, an excellent cycle performance, and a high rate charge/discharge characteristic by introducing Mg, Ca, Sr or Ba, or a small quantity of Al or Cr into the crystal structure of $LiNiO_2$.

A further investigation on the characteristics at high temperature showed that a great technical advantage was obtained with a compound substituted with the above-mentioned element and a compound of a combination of Mg and Al. Still another investigation on a combination other than the combination of Al and Mg revealed that a combination of four elements of Al, Mg, B and Co yielded a larger technical advantage than a single use of the respective elements.

In still another investigation on a partial substitution of lithium in $LiNiO_2$ with another element, it was clarified that the characteristics improved when Co, Al, Mg and Ca were used alone or in combination as the element for the substitution.

It is believed that the deterioration in the characteristics during the charging and discharging processes at high temperature is greatly influenced by a change in the chemical reactivity of the active material. By the introduction of the above-mentioned element into the crystal structure, the reactivity decreases during a deep charging up to a potential as high as 4 V or higher where the active material becomes particularly chemically active and the reaction of the active material with the electrolyte is suppressed accordingly. As a result, it is believed that the deterioration in the characteristics is effectively suppressed during the charging and discharging at high temperature.

By employing the above-mentioned elements for substitution, a great technical advantage has been obtained with $LiNiO_2$. In contrast, no favorable technical advantage has been obtained with $LiCoO_2$ which has a crystal structure similar to that of $LiNiO_2$ by the substitution with the above-mentioned elements. Even with $LiCoO_2$, some technical advantages have been obtained in an attempt to improve its initial discharge capacity, its cycle characteristic, its high rate charge/discharge characteristic and the like, by the introduction of the other elements into its crystal structure. However, the obtained technical advantages are not so remarkable as in the case of $LiNiO_2$. At high temperature, the characteristics of $LiCoO_2$ are conversely deteriorated by the introduction of the other elements.

It is believed that the stability of the crystal structure and the chemical property of $LiNiO_2$ differ from those of $LiCoO_2$, and the technical advantages resulting from the introduction of the other elements into $LiNiO_2$ differ from those of $LiCoO_2$. This may be due to the differences in the conditions for the synthesis without substitution of the element, or the differences in various characteristics between $LiNiO_2$ and $LiCoO_2$. The characteristics of $LiNiO_2$ as a product of the synthesis greatly differ depending on the conditions for synthesis and thus the control of the conditions for synthesis is critical, whereas $LiCoO_2$ can be synthesized relatively easily as a product having stable characteristics. That is, the above-mentioned technical advantages due to the introduction of the other elements are specific to $LiNiO_2$.

When the valence of nickel or lithium differs from the valences of the elements for the substitution, a balance between the valences may be maintained by varying the valence of nickel, or by varying the quantity (moiety) of oxygen in the below-mentioned range z. The quantity of oxygen also varies depending on the starting material and the temperature of heating in addition to the atmosphere used in the heating process.

While the novel features of the invention are set forth particularly in the appended claims, the invention, both as to organization and content, will be better understood and appreciated, along with other objects and features thereof, from the following detailed description taken in conjunction with the drawing.

DETAILED DESCRIPTION OF THE PREFERRED EMBODIMENTS

Figure 1:
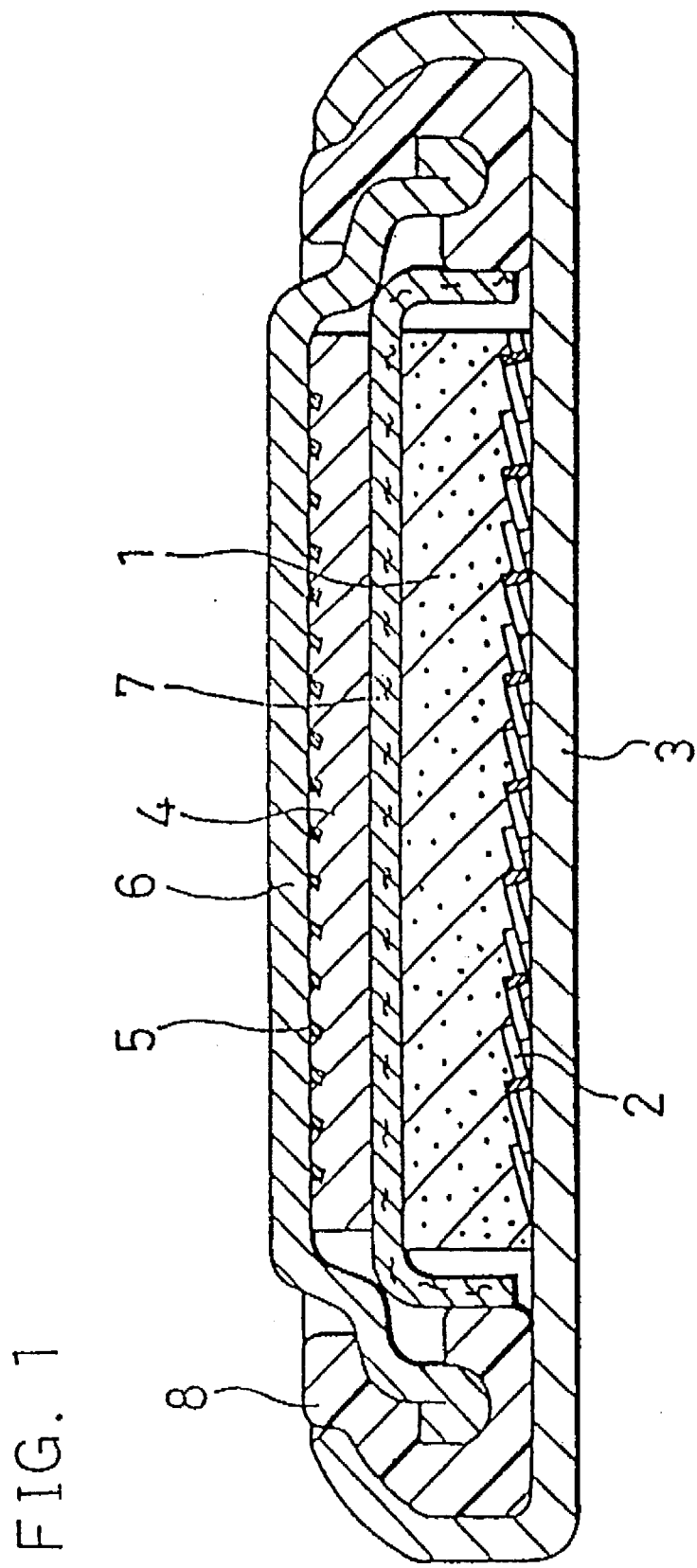
FIG. 1 is a longitudinal cross-sectional view of a battery in accordance with an example of the present invention.

The non-aqueous electrolyte lithium secondary battery in accordance with the present invention comprises a positive electrode which contains a compound obtained by substituting a part of nickel in $LiNiO_2$ with another element as its positive electrode active material; more specifically, a compound represented by the formula $Li_xNi_{1-y}M_yO_{2+z}$, where M represents at least one element selected from the group consisting of Mg, Ca, Sr and Ba, and $0.05 \leq x \leq 1.1$, $0.01 \leq y \leq 0.3$, and $-0.3 \leq z \leq 0.1$, a compound represented by the formula $Li_xNi_{1-y}M_yO_{2+z}$, where M represents at least one element selected from the group consisting of Al and Cr, and $0.05 \leq x \leq 1.1$, $0.003 \leq y < 0.1$, and $-0.3 \leq z \leq 0.1$, or a compound represented by the formula $Li_xNi_{1-y}(Al_aB_bCo_cMg_d)_yO_{2+z}$, where $0.05 \leq x \leq 1.1$, $0.01 \leq y \leq 0.3$, $-0.3 \leq z \leq 0.1$, and $(a+b+c+d) \leq 1$, and any three or more of a, b, c and d are never 0 at the same time.

The present invention also provides a non-aqueous electrolyte lithium secondary battery comprising a positive electrode which contains a compound obtained by substituting a part of lithium in $LiNiO_2$ with another element as its positive electrode active material; more specifically, a compound represented by the formula $Li_{1+x-y}Co_yNiO_{2+z}$, where $-0.1 \leq x \leq 0.1$, $0.005 \leq y \leq 0.2$, and $-0.3 \leq z \leq 0.2$, a compound represented by the formula $Li_{1+x-y}Al_yNiO_{2+z}$, where $-0.1 \leq x \leq 0.1$, $0.01 \leq y \leq 0.2$, and $-0.3 \leq z \leq 0.2$, a compound represented by the formula $Li_{1+x-y}M_yNiO_{2+z}$, where M represents at least one element selected from the group consisting of Mg and Ca, and $-0.1 \leq x \leq 0.1$, $0.01 \leq y \leq 0.2$, and $-0.3 \leq z \leq 0.1$, or a compound represented by the formula $Li_{1+x-y}(Mg_aCa_bCo_cAl_d)_yNiO_{2+z}$, where $-0.1 \leq x \leq 0.1$, $0.01 \leq y \leq 0.2$, $-0.3 \leq z \leq 0.2$, and $(a+b+c+d)=1$, and any three or more of a, b, c and d are never 0 at the same time.

In the following paragraphs, the present invention will be described in more detail with reference to its specific working examples and comparative examples. It is however needless to say that the present invention should not be limited to these specific working examples.

EXAMPLE 1

A description will be made on the use of Mg, Ca, Sr and Ba as the substitution elements for a part of nickel in $LiNiO_2$.

For Mg as the substitution element, $LiNO_3$, $Ni(OH)_2$ and $Mg(NO_3)_2$ were used as the starting materials and heated in an oxygen stream at 700° C. The mixing ratio of the starting materials was determined by adjusting the molar ratio of Li/(Mg+Ni) to 1.05 with the amount of lithium excessive and the molar ratio of Mg/(Mg+Ni) to 0.005, 0.01, 0.1, 0.2, 0.3 and 0.35.

Similarly, each of the active materials was synthesized by using a starting material containing $Ca(NO_3)_2$, $Ba(NO_3)_2$ or $Sr(NO_3)_2$ for Ca, Ba or Sr as the substitution element, respectively. Further, in place of the above-mentioned nitrate salts, one of hydroxides such as $Mg(OH)_2$, $Ca(OH)_2$, $Ba(OH)_2$, $Sr(OH)_2$ and the like can be used for the synthesis of the active material.

By an X-ray diffraction measurement on each of the synthesized samples, it was found that any of the obtained patterns resembled the patterns registered in 9-0063 of the "Joint Committee on Powder Diffraction Standards" (hereinafter referred to as JCPDS) and that each of the samples had a crystal structure similar to that represented by the registered pattern.

Further, it was found that any of the intensity ratios of a peak indicated by a facet index 003 to the peak indicated by a facet index 104 was 1.25 or more. $LiNiO_2$ has a layered structure of hexagonal system comprising nickel layers and lithium layers which are alternately sandwiched between oxygen layers. If the nickel is replaced by the lithium and a disorder takes place in the layered structure, the peak intensity ratio decreases. When the peak intensity ratio becomes 1.2 or less, the characteristics of $LiNiO_2$ are damaged, deteriorated because the diffusion of the lithium ions is hindered by the nickel. In this example, the above-mentioned peak intensity ratio is in a favorable range of 1.25 or more.

The positive electrode was configured in the following manner.

First, a positive electrode mixture was prepared by mixing the active material, acetylene black as a conductive agent and polyethylene tetrafluoride resin at 7:2:1 by weight and by sufficiently drying the obtained mixture. By molding 0.15 g of this positive electrode mixture with a pressure of 2 tons/cm² to a pellet of 17.5 mm diameter, a positive electrode was configured.

FIG. 1 is a cross-sectional view showing a battery produced by employing the electrode configured in the above-mentioned manner.

The positive electrode 1 is adhered by pressure to a collector 2 placed at a center of a battery housing 3 made of a metal. On this positive electrode 1, a porous polypropylene film 7 as a separator is placed. A negative electrode 4 is a metal lithium disc having a thickness of 0.8 mm and a diameter of 17.5 mm adhered by pressure to a sealing disc 6. The sealing disc 6 is provided with an annular gasket 8 made of polypropylene and a negative electrode collector 5. As the non-aqueous electrolyte, propylene carbonate which dissolves lithium perchlorate at 1 mol/L is employed. After adding the electrolyte to the separator 3, the positive electrode 1 and the negative electrode 4, the open end of the housing is closed.

The battery produced in the above-mentioned manner was subjected to a charge/discharge test at a current density of 0.5 mA/cm² under a voltage regulation in a range of 3.0 V–4.3 V. Measurements were made on an initial discharge capacity and a discharge capacity at the 20th cycle to derive a proportion of the discharge capacity at the 20th cycle to the initial discharge capacity, i.e., a discharge capacity maintenance rate. Thereafter, a discharge capacity at the 21st cycle was measured by increasing the current density to 2.5 mA/cm² at the 21st cycle to derive a proportion of the discharge capacity at the 21st cycle to the discharge capacity at the 20th cycle, i.e., another discharge capacity maintenance rate.

The results of the measurements are summarized in Table 1 below. Values in Table 1 are average values for each 10 cells of the respective samples. This also applies to the descriptions in the subsequent working examples and comparative examples. In Table 1, the capacity maintenance rate (1) represents a proportion of the discharge capacity at the current density of 0.5 mA/cm² at the 20th cycle to the initial discharge capacity, and the capacity maintenance rate (2) represents a proportion of the discharge capacity at the current density of 2.5 mA/cm² at the 21st cycle to that at the 20th cycle (this applies to any of the subsequent tables).

TABLE 1

| M | | M/(Ni + M) molar ratio (M: Mg, Ca, Sr or Ba) | | | | | |
|---|---|---|---|---|---|---|---|
| | | 0.005 | 0.01 | 0.10 | 0.20 | 0.30 | 0.35 |
| Mg | Initial Capacity (mAh) | 20.7 | 20.4 | 19.9 | 19.3 | 19.0 | 15.1 |
| | Capacity Maintenance Rate (1) (%) | 92 | 96 | 98 | 98 | 97 | 95 |
| | Capacity Maintenance Rate (2) (%) | 89 | 93 | 95 | 96 | 97 | 97 |
| Ca | Initial Capacity (mAh) | 20.7 | 20.3 | 19.8 | 19.3 | 19.0 | 15.1 |
| | Capacity Maintenance Rate (1) (%) | 92 | 96 | 98 | 98 | 97 | 94 |
| | Capacity Maintenance Rate (2) (%) | 88 | 92 | 94 | 96 | 97 | 97 |
| Sr | Initial Capacity (mAh) | 20.6 | 20.2 | 19.6 | 19.1 | 18.8 | 15.0 |
| | Capacity Maintenance Rate (1) (%) | 92 | 96 | 98 | 97 | 96 | 95 |
| | Capacity Maintenance Rate (2) (%) | 88 | 92 | 94 | 95 | 96 | 96 |
| Ba | Initial Capacity (mAh) | 20.6 | 20.1 | 19.6 | 19.0 | 18.7 | 15.0 |
| | Capacity Maintenance Rate (1) (%) | 92 | 96 | 97 | 97 | 96 | 94 |
| | Capacity Maintenance Rate (2) (%) | 88 | 92 | 94 | 95 | 95 | 95 |

EXAMPLE 2

A description will be made on the use of Al and Cr as the substitution elements for a part of nickel in $LiNiO_2$.

For Al as the substitution element, $LiNO_3$, $Ni(OH)_2$ and $Al(NO_3)_3$ were used as the starting materials and heated in an oxygen stream at 700° C. The mixing ratio of the starting materials was determined by adjusting the molar ratio of Li/(Al+Ni) to 1.05 with the amount of lithium excessive and the molar ratio of Al/(Al+Ni) to 0.002, 0.003, 0.05, 0.09 and 0.095.

Similarly, another active material was synthesized by using a starting material containing $Cr(NO_3)_3$ for Cr as the substitution element. Further, in place of the above-mentioned nitrate salts, one of hydroxides such as $Al(OH)_3$, $Cr(OH)_3$, and the like can be used for the synthesis of the active material.

By an X-ray diffraction measurement on each of the synthesized samples, it was found that any of the obtained patterns resembled the pattern registered in 9-0063 of "JCPDS" and that each of the samples had a crystal structure similar to that of the registered pattern.

Further, it was found that any of the intensity ratios of a peak indicated by a facet index 003 to the peak indicated by a facet index 104 was 1.25 or more.

A procedure similar to that of Example 1 was then followed in configuring batteries which were thereafter subjected to the charge/discharge test under the same conditions. The results of the test are summarized in Table 2 below.

TABLE 2

| M | | M/(Ni + M) molar ratio (M: Al or Cr) | | | | |
|---|---|---|---|---|---|---|
| | | 0.002 | 0.003 | 0.05 | 0.09 | 0.095 |
| Al | Initial Capacity (mAh) | 20.9 | 20.8 | 20.3 | 20.1 | 20.1 |
| | Capacity Maintenance Rate (1) (%) | 92 | 96 | 97 | 97 | 97 |
| | Capacity Maintenance Rate (2) (%) | 89 | 95 | 96 | 95 | 94 |
| Cr | Initial Capacity (mAh) | 21.0 | 20.9 | 20.6 | 20.5 | 20.5 |
| | Capacity Maintenance Rate (1) (%) | 92 | 95 | 96 | 96 | 96 |
| | Capacity Maintenance Rate (2) (%) | 88 | 94 | 95 | 94 | 93 |

Based on a comparison of the above-mentioned Examples 1 and 2 with Comparative Examples 1 and 2 which will be described later, the following facts are clarified.

As shown in Tables 1 and 2, the cycle characteristics and the high rate charge/discharge characteristics of the batteries are improved by employing the active materials containing one of Mg, Ca, Ba and Sr in a range of $0.01 \leq y \leq 0.3$ or one of Al and Cr in a range of $0.003 \leq y < 0.1$, respectively, as compared with those obtained with $LiNiO_2$ shown in Table 15. Further, as appreciated from Table 16 in Comparative Example 2, although the cycle characteristic is improved by employing one of Al and Cr in a range of $y \geq 0.1$, no substantial improvement is obtained in the high rate charge/discharge characteristic, as compared with those obtained with $LiNiO_2$. It is therefore found that a limit of $y < 0.1$ should be maintained when Al or Cr is used.

EXAMPLE 3

Next, a description will be given on the characteristics of the sample compounds of Example 1 at elevated temperatures.

In this example, the same positive electrode active materials and the batteries for evaluation as those of Example 1 were used.

Tables 3–6 summarize the results of the evaluations conducted on the initial discharge capacities and the capacity maintenance rate at the 20th cycle of the batteries subjected to a charge/discharge test at a current density of 0.5 $mA/cm^2$ under a voltage regulation in a range of 3.0 V–4.3 V at the respective temperatures of 25° C. and 60° C.

TABLE 3

| M | | y | | | | | |
|---|---|---|---|---|---|---|---|
| | | 0.005 | 0.01 | 0.10 | 0.20 | 0.30 | 0.35 |
| Mg | Initial Capacity (mAh) | | | | | | |
| | (25° C.) | 20.7 | 20.4 | 19.9 | 19.3 | 19.0 | 15.1 |
| | (60° C.) | 21.3 | 20.9 | 20.4 | 19.7 | 19.4 | 15.5 |
| | Capacity Maintenance Rate | | | | | | |
| | (25° C., %) | 92 | 96 | 98 | 98 | 97 | 95 |
| | (60° C., %) | 63 | 86 | 88 | 88 | 88 | 87 |

TABLE 4

| M | | y | | | | | |
|---|---|---|---|---|---|---|---|
| | | 0.005 | 0.01 | 0.10 | 0.20 | 0.30 | 0.35 |
| Ca | Initial Capacity (mAh) | | | | | | |
| | (25° C.) | 20.7 | 20.3 | 19.8 | 19.3 | 19.0 | 15.1 |
| | (60° C.) | 21.4 | 20.7 | 20.4 | 19.8 | 19.3 | 15.2 |
| | Capacity Maintenance Rate | | | | | | |
| | (25° C., %) | 92 | 96 | 98 | 98 | 97 | 94 |
| | (60° C., %) | 61 | 87 | 88 | 89 | 89 | 88 |

TABLE 5

| M | | y | | | | | |
|---|---|---|---|---|---|---|---|
| | | 0.005 | 0.01 | 0.10 | 0.20 | 0.30 | 0.35 |
| Sr | Initial Capacity (mAh) | | | | | | |
| | (25° C.) | 20.6 | 20.2 | 19.6 | 19.1 | 18.8 | 15.0 |
| | (60° C.) | 21.2 | 20.9 | 20.5 | 19.6 | 19.3 | 15.2 |
| | Capacity Maintenance Rate | | | | | | |
| | (25° C., %) | 91 | 96 | 98 | 97 | 96 | 95 |
| | (60° C., %) | 60 | 85 | 86 | 87 | 87 | 87 |

TABLE 6

| M | | y | | | | | |
|---|---|---|---|---|---|---|---|
| | | 0.005 | 0.01 | 0.10 | 0.20 | 0.30 | 0.35 |
| Ba | Initial Capacity (mAh) | | | | | | |
| | (25° C.) | 20.6 | 20.1 | 19.6 | 19.0 | 18.7 | 15.0 |
| | (60° C.) | 21.3 | 20.7 | 20.3 | 19.6 | 19.4 | 15.3 |
| | Capacity Maintenance Rate | | | | | | |
| | (25° C., %) | 92 | 96 | 97 | 97 | 96 | 94 |
| | (60° C., %) | 61 | 84 | 86 | 86 | 87 | 87 |

As shown in Tables 3 through 6, the cycle characteristics at elevated temperature are improved by employing one of Mg, Ca, Ba and Sr as the substitution element for Ni in a range of $0.01 \leq y \leq 0.3$, as compared with that obtained with $LiNiO_2$ of Comparative Example 3. No favorable technical advantage is obtained in a range of y<0.01 because the quantity for the substitution is too small. Further, the quantity for the substitution is too much in a range of y>0.3 and invites a decrease in the initial discharge capacity.

In Comparative Example 4, a description is made on a sample compound represented by $LiCo_{1-y}Mg_yO_2$, i.e., an example wherein a part of Co in $LiCoO_2$ is substituted with Mg. According to Comparative Example 4, no favorable technical advantage is obtained by substituting a part of Co in $LiCoO_2$ with Mg, and the characteristic is conversely deteriorated. It is therefore found that in accordance with the present invention a great technical advantage is obtained by the substitution of an element particularly in a nickel oxide.

EXAMPLE 4

A description will be given on the characteristics of the sample compounds of Example 2 at elevated temperature.

In this example, the same positive electrode active materials and the batteries for evaluation as those of Example 2 were used.

The results of the evaluations by the charge/discharge test conducted under the same conditions as in Example 3 are summarized in Tables 7 and 8 below, respectively.

TABLE 7

| M | | | y | | |
|---|---|---|---|---|---|
| | 0.002 | 0.003 | 0.05 | 0.09 | 0.095 |
| Al Initial Capacity (mAh) | | | | | |
| (25° C.) | 20.9 | 20.8 | 20.3 | 20.1 | 20.1 |
| (60° C.) | 21.5 | 21.3 | 20.8 | 20.5 | 20.4 |
| Capacity Maintenance Rate | | | | | |
| (25° C., %) | 92 | 96 | 97 | 97 | 97 |
| (60° C., %) | 63 | 85 | 88 | 88 | 87 |

TABLE 8

| M | | | y | | |
|---|---|---|---|---|---|
| | 0.002 | 0.003 | 0.05 | 0.09 | 0.095 |
| Cr Initial Capacity (mAh) | | | | | |
| (25° C.) | 21.0 | 20.9 | 20.6 | 20.5 | 20.5 |
| (60° C.) | 21.7 | 21.4 | 20.9 | 20.7 | 20.6 |
| Capacity Maintenance Rate | | | | | |
| (25° C., %) | 92 | 95 | 96 | 96 | 96 |
| (60° C., %) | 61 | 85 | 87 | 87 | 87 |

As shown in Table 7, the cycle characteristic at the elevated temperatures is improved by employing Al as the substitution element for Ni in a range of $0.003 \leq y < 0.1$, as compared with that obtained with $LiNiO_2$ of Comparative Example 3. As shown by Comparative Example 9, the cycle characteristic at room temperature is improved in a range of $y \geq 0.1$, but no great improvement is obtained at high temperature as compared with that of $LiNiO_2$. The range should therefore be y<0.1 for the single use of Al.

In Comparative Example 5, a sample compound represented by $LiCo_{1-y}Al_yO_2$ is described. According to Comparative Example 5, no favorable technical advantage is obtained by substituting a part of Co in $LiCoO_2$ with Al, and the characteristics are conversely deteriorated. It is therefore appreciated that in accordance with the present invention a great technical advantage is obtained by the substitution of element particularly in a nickel oxide.

As shown in Table 8, a technical advantage similar to the case of Al is obtained in a case of substituting a part of nickel in $LiNiO_2$ with Cr and the cycle characteristic at elevated temperature is improved with the quantity of substitution in a range of $0.003 \leq y < 0.1$.

EXAMPLE 5

A description will be made on a case of employing two or more elements selected from the group consisting of Al, B, Co and Mg as the substitution element for a part of nickel in $LiNiO_2$.

$Al(NO_3)_3$, $H_3BO_3$, $Co_3O_4$ and $Mg(NO_3)_2$ were employed as the sources for Al, B, Co and Mg, respectively. These compounds were mixed with $LiNO_3$ and $Ni(OH)_2$, and each of the obtained mixtures was heated in an oxygen stream at 650° C. The mixing ratio of the starting materials was determined by adjusting the molar ratio of Li/(Ni+(a combination of two or more elements selected from the group consisting of Al, B, Co and Mg)) to 1.05 with the amount of lithium excessive and the molar ratio of Al, B, Co and Mg to the intended composition.

By an X-ray diffraction measurement on each of the heated samples, it was appreciated that any of the obtained patterns resembled the pattern registered in 9-0063 of "JCPDS" and that each of the samples had a crystal structure similar to that represented by the registered pattern.

Further, it was found that any of the intensity ratios of a peak indicated by a facet index 003 to the peak indicated by a facet index 104 was 1.25 or more. There were no peaks induced by impurities other than the peaks similar to that of $LiNiO_2$, and it was believed that each of the heated samples had a composition of the compounds as listed in Table 9 below.

A procedure similar to that of Example 1 was then followed in configuring batteries with the above-mentioned compounds which were thereafter subjected to the charge/discharge test under the conditions of a current density of 0.5 mA/cm² and a voltage regulation in a range of 3.0 V–4.3 V. The initial discharge capacities and the capacity maintenance rates at the 20th cycle at 25° C. and 60° C. are summarized in Table 9 below.

TABLE 9

| | Initial capacity (mAh) | | Capacity maintenance rate at the 20th cycle (%) | |
|---|---|---|---|---|
| | 25° C. | 60° C. | 25° C. | 60° C. |
| $LiNi_{0.9}(Al_{0.5}Mg_{0.5})_{0.1}O_2$ | 19.7 | 20.1 | 98 | 93 |
| $LiNi_{0.9}(Al_{0.5}B_{0.5})_{0.1}O_2$ | 19.5 | 20.0 | 97 | 91 |
| $LiNi_{0.9}(Al_{0.5}Co_{0.5})_{0.1}O_2$ | 19.6 | 20.0 | 98 | 93 |
| $LiNi_{0.9}(B_{0.5}Co_{0.5})_{0.1}O_2$ | 19.5 | 19.9 | 97 | 89 |
| $LiNi_{0.9}(Co_{0.5}Mg_{0.5})_{0.1}O_2$ | 19.7 | 20.1 | 98 | 92 |
| $LiNi_{0.9}(B_{0.5}Mg_{0.5})_{0.1}O_2$ | 19.6 | 20.0 | 97 | 92 |
| $LiNi_{0.9}(Al_{0.3}B_{0.3}Co_{0.4})_{0.1}O_2$ | 19.6 | 20.0 | 98 | 90 |
| $LiNi_{0.9}(Al_{0.3}B_{0.3}Mg_{0.4})_{0.1}O_2$ | 19.6 | 20.0 | 98 | 92 |
| $LiNi_{0.9}(Al_{0.3}Co_{0.3}Mg_{0.4})_{0.1}O_2$ | 19.7 | 20.1 | 98 | 93 |
| $LiNi_{0.9}(B_{0.3}Co_{0.3}Mg_{0.4})_{0.1}O_2$ | 19.6 | 20.0 | 98 | 91 |
| $LiNi_{0.9}((AlBCoMg)_{0.25})_{0.1}O_2$ | 19.5 | 19.9 | 97 | 90 |
| $LiNi_{0.7}(Al_{0.5}Mg_{0.5})_{0.3}O_2$ | 19.2 | 19.6 | 97 | 89 |
| $LiNi_{0.7}(Al_{0.3}Co_{0.3}Mg_{0.4})_{0.3}O_2$ | 19.3 | 19.6 | 97 | 88 |
| $LiNi_{0.7}((AlBCoMg)_{0.25})_{0.3}O_2$ | 19.2 | 19.5 | 96 | 87 |
| $LiNi_{0.99}(Al_{0.5}Mg_{0.5})_{0.01}O_2$ | 20.7 | 21.3 | 96 | 88 |

TABLE 9-continued

|  | Initial capacity (mAh) | | Capacity maintenance rate at the 20th cycle (%) | |
|---|---|---|---|---|
|  | 25° C. | 60° C. | 25° C. | 60° C. |
| $LiNi_{0.99}(Al_{0.3}Co_{0.3}Mg_{0.4})_{0.01}O_2$ | 20.8 | 21.4 | 96 | 87 |
| $LiNi_{0.99}((AlBCoMg)_{0.25})_{0.01}O_2$ | 20.6 | 21.3 | 95 | 86 |

As shown in Table 9, the cycle characteristics at elevated temperatures are improved as compared with that obtained with $LiNiO_2$ of Comparative Example 3, by employing two or more elements selected from the group consisting of Al, B, Co and Mg as the substitution element for Ni. Further, a more favorable characteristic can be obtained than that obtained by the single use of the respective elements in Comparative Examples 6 and 7, and Examples 3 and 4.

Moreover, as clearly seen from a comparison with Table 20 in Comparative Example 8 which will be described later, molar ratios should be in the range of $0.01 \leq y \leq 0.3$ and $(a+b+c+d) \leq 1$, if Al, B, Co and Mg are used in combination. If $y<0.01$, the characteristics may be deteriorated because the technical advantage resulting from the substitution of element is small. The quantity to be substituted for Ni is too much if $y>0.3$. In addition, if $(a+b+c+d)>1$, a disorder develops in the crystal structure and invites a deterioration in the characteristics.

EXAMPLE 6

A description will be given on the substitution of a part of lithium in $LiNiO_2$ with Co.

First, a positive electrode active material was synthesized form starting materials of $LiNO_3$, $Ni(OH)_2$ and $CO(OH)_2$ by heating them in an oxygen stream at 650° C. The mixing ratio of the starting materials was determined by adjusting the molar ratio of (Li+Co)/Ni to 1 and the molar ratio of Co/(Li+Co) to 0.003, 0.005, 0.01, 0.1, 0.2 and 0.3. Further, in place of the above-mentioned compounds, the active materials can similarly be synthesized by using cobalt carbonate, $CoCO_3$.

From an X-ray diffraction measurement, the heated product was considered to be a compound represented by the formula $Li_{1-y}Co_yNiO_{2+z}$ (y=0.003, 0.005, 0.01, 0.1, 0.2 or 0.3), on the basis of a comparison with the pattern registered in 9-0063 of "JCPDS".

Further, it was found that any of the intensity ratios of a peak indicated by a facet index 003 to the peak indicated by a facet index 104 was in a range of 1.15–1.20. In $LiNiO_2$, a disorder develops in the crystal structure by an introduction of Ni into the layer of Li and the peak intensity ratio decreases. From this fact, it is believed that the Co in the heated product is existing in the layer of Li. Although the characteristics of $LiNiO_2$ may be deteriorated by the introduction of Ni into the layer of Li, there occurs no deterioration in the characteristics of the heated product of this example, even if Co is existing in the layer of Li.

A procedure similar to that of Example 1 was then followed in configuring batteries with the above-mentioned compounds which were thereafter subjected to the charge/discharge test under the conditions of a current density of 1 mA/cm² and a voltage regulation in a range of 3.0 V–4.3 V. The initial discharge capacities and the capacity maintenance rates at the 20th cycle were measured at 25° C. and 60° C., and the results are summarized in Table 10 below.

TABLE 10

| M | y | | | | | |
|---|---|---|---|---|---|---|
|  | 0.003 | 0.005 | 0.01 | 0.10 | 0.20 | 0.30 |
| Co Initial Capacity (mAh) | | | | | | |
| (25° C.) | 20.0 | 20.0 | 19.8 | 19.6 | 19.2 | 15.1 |
| (60° C.) | 20.3 | 20.1 | 20.0 | 19.7 | 19.3 | 15.3 |
| Capacity Maintenance Rate at the 50th cycle | | | | | | |
| (25° C., %) | 92 | 93 | 94 | 96 | 96 | 94 |
| (60° C., %) | 62 | 85 | 89 | 88 | 87 | 87 |

As shown in Table 10, the cycle characteristic at elevated temperature is improved by employing Co as the. substitution element for Li in a range of $0.005 \leq y \leq 0.2$, as compared with that obtained with $LiNiO_2$ of Comparative Example 3. In a range of $y<0.005$, a technical advantage resulting from the substitution of element is small, but in the range of $y>0.2$, the quantity to be substituted for Li is too much and invites a deterioration in the characteristics. The range should therefore be $0.005 \leq y \leq 0.2$ if Co is used solely as the substitution element for Li.

In Comparative Example 10 which will be described later, a description is given on $LiNi_{1-y}Co_yO_2$ which is a product obtained by substituting a part of Ni in $LiNiO_2$ with Co. Although this compound is improved in its cycle characteristic at 25° C. as compared with $LiNiO_2$, its cycle characteristic at 60° C. is not satisfactory. It is appreciated that the compound of this example $Li_{1-y}Co_yNiO_{2+z}$, which is a product obtained by substituting a part of Li in $LiNiO_2$ with Co, also demonstrates a great improvement in the cycle characteristic at 60° C. and can serve as a more excellent positive electrode active material.

EXAMPLE 7

A description will be given on the substitution of a part of lithium in $LiNiO_2$ with Al.

First, a positive electrode active material was synthesized by heating a mixture composed of $LiNO_3$, $Ni(OH)_2$ and $Al(NO_3)_3$ in an oxygen stream at 650° C. The mixing ratio of the starting materials was determined by adjusting the molar ratio of (Li+Al)/Ni to 1 and the molar ratio of Al/(Li+Al) to 0.005, 0.01, 0.1, 0.2, 0.25 and 0.3. Further, in place of the above-mentioned compounds, an aluminum hydroride $Al(OH)_3$ can similarly be used for the synthesis of the active material.

From an X-ray diffraction measurement, the heated product was considered to be a compound represented by the formula $Li_{1-y}Al_yNiO_{2+z}$ (y=0.005, 0.01, 0.1, 0.2, 0.25 or 0.3), on the basis of a comparison with the pattern registered in 9-0063 of "JCPDS".

Further, it was found that any of the intensity ratios of a peak indicated by a facet index 003 to the peak indicated by a facet index 104 was in a range of 1.15–1.20, and from this peak intensity ratio, it is believed that the Al in the heated product is existing in the layer of Li. In $LiNiO_2$, although the characteristics may be deteriorated by the introduction of Ni in the layer of Li, there occurs no deterioration in the characteristics of the heated product of this example, even if Al is existing in the layer of Li.

A procedure similar to that of Example 1 was then followed in configuring batteries which were thereafter subjected to the charge/discharge tests under the same conditions as those in Example 6. The results derived from the tests as in Example 6 are summarized in Table 11 below.

TABLE 11

| M | y | | | | | |
|---|---|---|---|---|---|---|
| | 0.005 | 0.01 | 0.10 | 0.20 | 0.25 | 0.30 |
| Al Initial Capacity (mAh) | | | | | | |
| (25° C.) | 20.6 | 20.0 | 19.8 | 19.7 | 15.5 | 14.6 |
| (60° C.) | 20.8 | 20.4 | 20.3 | 19.8 | 15.6 | 14.8 |
| Capacity Maintenance Rate at the 50th cycle | | | | | | |
| (25° C., %) | 92 | 94 | 95 | 96 | 95 | 94 |
| (60° C., %) | 61 | 87 | 88 | 88 | 89 | 88 |

As shown in Table 11, the cycle characteristic at elevated temperature is improved by employing Al as the substitution element for Li in a range of $0.01 \leq y \leq 0.2$, as compared with that obtained with $LiNiO_2$ of Comparative Example 9. In a range of $y<0.01$, a technical advantage resulting from the substitution of element is small. In a range of $y>0.2$, the quantity to be substituted for Li is too much and invites a deterioration in the characteristics.

From a comparison with $LiNi_{1-y}Al_yO_2$, which is a product obtained by substituting a part of Ni in $LiNiO_2$ with Al and referred to in Example 2, it is appreciated that at the 50th cycle at 60° C. the compound $Li_{1-y}Al_yNiO_2$ in accordance with this example, which is a product obtained by substituting a part of Li in $LiNiO_2$ with Al, demonstrates a capacity maintenance rate equivalent to the capacity maintenance rate of the compound in Example 2 at the 20th cycle at 60° C., and that an excellent characteristic is obtained by substituting aluminum for a part of lithium.

EXAMPLE 8

A description will be given on the substitution of a part of lithium in $LiNiO_2$ with Mg.

First, a positive electrode active material was synthesized by heating a mixture composed of $LiNO_3$, $Ni(OH)_2$ and $Mg(NO_3)_2$ in an oxygen stream at 650° C. The mixing ratio of the starting materials was determined by adjusting the molar ratio of (Li+Mg)/Ni to 1 and the molar ratio of Mg/(Li+Mg) to 0.005, 0.01, 0.1, 0.2, 0.25 and 0.3. Further, in place of the above-mentioned compounds, magnesium hydroxide $Mg(OH)_2$ can similarly be used for the synthesis of the active material.

From an X-ray diffraction measurement, the heated product was considered to be a compound represented by the formula $Li_{1-y}Mg_yNiO_{2+z}$ (y=0.005, 0.01, 0.1, 0.2, 0.25 or 0.3), on the basis of a comparison with the pattern registered in 9-0063 of "JCPDS".

Further, it was found that any of the intensity ratios of a peak indicated by a facet index 003 to the peak indicated by a facet index 104 was in a range of 1.15–1.20, and from this peak intensity ratio, it is believed that the Mg in the heated product is existing in the layer of Li. In $LiNiO_2$, although the characteristics may be deteriorated by the introduction of Ni into the layer of Li, there occurs no deterioration in the characteristics of the heated product of this example, even if Mg is existing in the layer of Li.

A procedure similar to that of Example 1 was then followed in configuring batteries which were thereafter subjected to the charge/discharge tests under the same conditions as those in Example 6. The results derived from the tests as in Example 6 are summarized in Table 12 below.

TABLE 12

| M | y | | | | | |
|---|---|---|---|---|---|---|
| | 0.005 | 0.01 | 0.10 | 0.20 | 0.25 | 0.30 |
| Mg Initial Capacity (mAh) | | | | | | |
| (25° C.) | 20.5 | 20.1 | 19.9 | 19.2 | 16.4 | 15.0 |
| (60° C.) | 21.1 | 20.7 | 20.2 | 19.6 | 17.0 | 15.3 |
| Capacity Maintenance Rate at the 50th cycle | | | | | | |
| (25° C., %) | 90 | 94 | 96 | 96 | 95 | 93 |
| (60° C., %) | 60 | 87 | 87 | 88 | 87 | 87 |

As shown in Table 12, the cycle characteristic at elevated temperature is improved by employing Mg as the substitution element for Li in a range of $0.01 \leq y \leq 0.2$, as compared with that obtained with $LiNiO_2$ of Comparative Example 9. In a range of $y<0.01$, no favorable technical advantage is obtained because the quantity of the substitution is small. In a range of $y>0.2$, the quantity of substitution is too much and invites a decrease in the initial discharge capacity. Based on the above-mentioned results, it is appreciated that in a nickel oxide, the cycle characteristic at high temperature is improved by substituting a part of Li with Mg.

When a similar test was conducted on a compound obtained by substituting a part of Li with Ca in place of Mg, the result was substantially the same as in the case of Mg, and it was found that a similar technical advantage to that of Mg was obtained by Ca as shown in Table 13 below.

TABLE 13

| M | y | | | | | |
|---|---|---|---|---|---|---|
| | 0.005 | 0.01 | 0.10 | 0.20 | 0.25 | 0.30 |
| Ca Initial Capacity (mAh) | | | | | | |
| (25° C.) | 20.4 | 20.0 | 19.7 | 19.2 | 16.3 | 15.0 |
| (60° C.) | 21.0 | 20.5 | 20.0 | 19.5 | 17.1 | 15.1 |
| Capacity Maintenance Rate at the 50th cycle | | | | | | |
| (25° C., %) | 90 | 93 | 95 | 95 | 94 | 92 |
| (60° C., %) | 60 | 86 | 87 | 87 | 88 | 89 |

EXAMPLE 9

A description will be made on the substitution of a part of nickel in $LiNiO_2$ with two or more elements selected from the group consisting of Mg, Ca, Co and Al.

$Mg(NO_3)_2$, $Ca(OH)_2$, $Co_3O_4$ and $Al(NO_3)_3$ were employed as the sources for Mg, Ca, Co and Al, respectively. These compounds were mixed with $LiNO_3$ and $Ni(OH)_2$ and each of the obtained mixtures was heated in an oxygen stream at 650° C. The mixing ratio of the starting materials was determined by adjusting the molar ratio of (Li+(a combination of two or more elements selected from the group consisting of Mg, Ca, Co and Al))/Ni to 1, and the molar ratio of Mg, Ca, Co and Al to the intended composition.

From X-ray diffraction measurements on the heated products and comparisons of the diffraction patterns with the pattern registered in 9-0063 of "JCPDS", the obtained heated products appeared to be the compounds as listed in Table 14 below.

Further, it was found that any of the intensity ratios of a peak indicated by a facet index 003 to the peak indicated by a facet index 104 was in a range of 1.15–1.20, and based on the intensity ratios, it is believed that the element substituted for Li was existing in the layer of Li. In $LiNiO_2$, although the characteristics may be deteriorated by an introduction of Ni into the layer of Li, there was no deterioration in the characteristics of the compounds in accordance with this example even if the substitution element was existing in the layer of Li.

A procedure similar to that of Example 1 was then followed in configuring batteries with the above-mentioned compounds which were thereafter subjected to the charge/discharge test under the same conditions as those in Example 6. The results derived from the tests as in Example 6 are summarized in Table 14 below.

TABLE 14

|  | 25° C. | | 60° C. | |
|---|---|---|---|---|
|  | Initial capacity (mAh) | Capacity maintenance rate (50th cycle) | Initial capacity (mAh) | Capacity maintenance rate (50th cycle) |
| $Li_{0.995(Al_{0.5}Mg_{0.5})_{0.005}}NiO_2$ | 20.5 | 96% | 20.6 | 55% |
| $Li_{0.99}(Al_{0.5}Mg_{0.5})_{0.01}NiO_2$ | 20.0 | 97% | 20.2 | 89% |
| $Li_{0.95}(Al_{0.5}Co_{0.5})_{0.05}NiO_2$ | 19.7 | 97% | 20.0 | 90% |
| $Li_{0.70}(Al_{0.5}Co_{0.5})_{0.30}NiO_2$ | 14.4 | 98% | 14.6 | 91% |
| $Li_{0.80}(Mg_{0.2}Ca_{0.8})_{0.20}NiO_2$ | 19.4 | 98% | 19.6 | 90% |
| $Li_{0.90}(Co_{0.5}Mg_{0.5})_{0.10}NiO_2$ | 19.6 | 96% | 20.0 | 90% |
| $Li_{0.80}(Co_{0.5}Ca_{0.5})_{0.20}NiO_2$ | 19.3 | 97% | 19.5 | 91% |
| $Li_{0.80}(Co_{0.3}Ca_{0.7})_{0.20}NiO_2$ | 19.4 | 96% | 19.3 | 89% |
| $Li_{0.90}(Al_{0.3}Mg_{0.3}Co_{0.4})_{0.10}NiO_2$ | 19.5 | 97% | 19.8 | 91% |
| $Li_{0.99}(Al_{0.3}Ca_{0.3}Mg_{0.4})_{0.01}NiO_2$ | 19.9 | 96% | 20.1 | 89% |
| $Li_{0.80}(Al_{0.3}Co_{0.3}Mg_{0.4})_{0.20}NiO_2$ | 19.5 | 98% | 19.5 | 92% |
| $Li_{0.70}(Ca_{0.3}Co_{0.3}Mg_{0.4})_{0.30}NiO_2$ | 14.2 | 98% | 14.5 | 95% |
| $Li_{0.90}(Al_{0.2}Co_{0.4}Mg_{0.4})_{0.10}NiO_2$ | 19.5 | 96% | 19.6 | 90% |
| $Li_{0.99}(Al_{0.2}Ca_{0.3}Co_{0.5})_{0.01}NiO_2$ | 20.1 | 95% | 21.0 | 89% |
| $Li_{0.995}((AlCaCoMg)_{0.25})_{0.005}NiO_2$ | 20.2 | 94% | 20.3 | 60% |
| $Li_{0.99}((AlCaCoMg)_{0.25})_{0.01}NiO_2$ | 20.0 | 93% | 20.3 | 88% |
| $Li_{0.90}((AlCaCoMg)_{0.25})_{0.10}NiO_2$ | 19.5 | 95% | 19.8 | 90% |
| $Li_{0.80}((AlCaCoMg)_{0.25})_{0.20}NiO_2$ | 19.2 | 96% | 19.5 | 91% |
| $Li_{0.75}((AlCaCoMg)_{0.25})_{0.25}NiO_2$ | 15.5 | 97% | 15.8 | 90% |

As shown in Table 14, by employing a combination of two or more elements selected from the group consisting of Mg, Ca, Co and Al, respectively as the substitution element for Li, more preferable characteristics are obtained as compared with those obtained by a single use of the respective elements in Examples 6, 7 and 8. When any two or more of Mg, Ca, Co and Al are used in combination, it is desirable that the quantity for substitution is in a range of $0.01 \leq y \leq 0.2$. The technical advantage resulting from the substitution of element is small if the range is $y < 0.01$. The quantity for substitution is too much and invites a deterioration in the characteristics if the range is $y > 0.2$.

COMPARATIVE EXAMPLE 1

A description will be made on the use of $LiNiO_2$ as the active material.

$LiNO_3$ and $Ni(OH)_2$ were used as the starting materials. A mixture of these compounds was heated in an oxygen stream at 700° C. The mixing ratio of the starting materials was determined by the molar ratio of Li/Ni to 1.05 with the amount of lithium excessive. From an X-ray diffraction measurement on the synthesized compounds, it was appreciated that the obtained pattern coincided with the pattern of $LiNiO_2$ registered in 9-0063 of "JCPDS". It was further found that the intensity ratio of a peak indicated by a facet index 003 to the peak indicated by a facet index 104 was 1.3. If the peak intensity ratio becomes 1.2 or less, a deterioration arises in the characteristics because the diffusion of the lithium ions is hindered by the nickel. In this comparative example, the above-mentioned peak intensity ratio is in a favorable range of 1.3.

A procedure similar to that of Example 1 was then followed in configuring batteries which were thereafter subjected to the charge/discharge test under the same conditions. The results of the test are summarized in Table 15 below.

TABLE 15

| Initial capacity (mAh) | 21.2 |
|---|---|
| Capacity Maintenance Rate (1) | 91% |
| Capacity Maintenance Rate (2) | 87% |

COMPARATIVE EXAMPLE 2

A description will be made on the use of Al and Cr as the elements for substituting a part of nickel in $LiNiO_2$.

For Al, a mixture of $LiNO_3$, $Ni(OH)_2$ and $Al(NO_3)_3$ was heated in an oxygen stream at 700° C. The mixing ratio of the starting materials was determined by adjusting the molar ratio of Li/(Al+Ni) to 1.05 with the amount of lithium excessive and the molar ratio of Al/(Al+Ni) to 0.1, 0.2, 0.3, 0.4 and 0.5.

Similarly, another active material was synthesized by using a starting material containing $Cr(NO_3)_3$ for Cr.

From X-ray diffraction measurements on the synthesized samples, it was appreciated that the obtained patterns resembled the pattern of $LiNiO_2$ registered in 9-0063 of "JCPDS" and that the samples had a crystal structure similar to that represented by the registered pattern.

It was further found that any of the intensity ratios of a peak indicated by a facet index 003 to the peak indicated by a facet index 104 was 1.25 or more.

A procedure similar to that of Example 1 was then followed in configuring batteries which were thereafter subjected to the charge/discharge test under the same conditions. The results of the test are summarized in Table 16 below.

TABLE 16

|  |  | M/(Ni + M) molar ratio (M: Al or Cr) | | | | |
|---|---|---|---|---|---|---|
| M |  | 0.10 | 0.20 | 0.30 | 0.40 | 0.50 |
| Al | Initial Capacity (mAh) | 20.1 | 19.8 | 19.5 | 15.3 | 12.8 |
|  | Capacity Maintenance Rate (1) (%) | 97 | 97 | 97 | 96 | 93 |
|  | Capacity Maintenance Rate (2) (%) | 88 | 86 | 86 | 85 | 85 |
| Cr | Initial Capacity (mAh) | 20.5 | 20.2 | 19.9 | 17.1 | 14.3 |
|  | Capacity Maintenance Rate (1) (%) | 96 | 96 | 94 | 91 | 86 |
|  | Capacity Maintenance Rate (2) (%) | 87 | 84 | 83 | 79 | 73 |

COMPARATIVE EXAMPLE 3

A description will be made on the use of $LiNiO_2$ as the active material at elevated temperature.

A mixture of $LiNO_3$ and $Ni(OH)_2$ was heated in an oxygen stream at 650° C. The mixing ratio of the starting materials was determined by adjusting the molar ratio of Li/Ni to 1.05 with the amount of lithium excessive. From an X-ray diffraction measurement on the synthesized $LiNiO_2$, it was appreciated that the obtained pattern coincided with the pattern registered in 9-0063 of "JCPDS". It was further found that the intensity ratio of a peak indicated by a facet index 003 to the peak indicated by a facet index 104 was 1.3.

A procedure similar to that of Example 1 was then followed in configuring batteries which were thereafter subjected to the charge/discharge test under the same conditions as those of Example 3. The results of the test are summarized in Table 17 below.

TABLE 17

| Initial capacity (mAh) | |
| --- | --- |
| (25° C.) | 21.2 |
| (60° C.) | 21.8 |
| Capacity maintenance rate at the 20th cycle | |
| (25° C.) | 91% |
| (60° C.) | 53% |

COMPARATIVE EXAMPLE 4

A description will be made on $LiCoO_2$ and a derivative of $LiCoO_2$ which incorporates Mg.

The $LiCoO_2$ was synthesized by heating a mixture of $Li_2CO_3$ and $Co_3O_4$ in the air at 900° C. The mixing ratio of the starting materials was determined by adjusting the molar ratio of Li/Co to 1.00.

If Mg is incorporated, $Li_2CO_3$, $Co_3O_4$ and $Mg(NO_3)_2$ were used as the starting materials. The mixing ratio of the starting materials was determined by adjusting the molar ratio of Li/(Mg+Co) to 1.00 and the molar ratio of Mg/(Mg+Co) to 0.1.

From X-ray diffraction measurements on the heated products, it was appreciated that the obtained patterns resembled the pattern of $LiCoO_2$ registered in 16-0427 of "JCPDS" and that the samples had a crystal structure similar to that represented by the registered pattern. Since no peak due to impurities other than those resembling the pattern of $LiCoO_2$ was observed, it was believed that the heated products were $LiCoO_2$ and a compound represented by the formula $LiCo_{1-y}Mg_yO_2$ (y=0.1), respectively.

A procedure similar to that of Example 1 was then followed in configuring batteries which were thereafter subjected to the charge/discharge test under the same conditions as those of Example 3. The results of the test are summarized in Table 18 below.

COMPARATIVE EXAMPLE 5

A description will be made on a case of introducing Al into $LiCoO_2$.

A mixture composed of $Li_2CO_3$, $Co_3O_4$ and $Al(NO_3)_3$ was heated in the air at 900° C. The mixing ratio of the starting materials was determined by adjusting the molar ratio of Li/(Al+Co) to 1.00 and the molar ratio of Al/(Al+Co) to 0.05.

X-ray diffraction measurements on the heated products suggested that the obtained pattern resembled the pattern of $LiCoO_2$ registered in 16-0427 of "JCPDS" and that the sample had a crystal structure similar to that represented by the registered pattern. Since no peak due to impurities other than those resembling the pattern of $LiCoO_2$ was observed, it was believed that the heated product was a compound represented by the formula $LiCo_{1-y}Al_yO_2$ (y=0.05).

A procedure similar to that of Example 1 was then followed in configuring batteries which were thereafter subjected to the charge/discharge test under the same conditions as those of Example 3. The results of the test are summarized in Table 18.

TABLE 18

| M (y) | Mg (0.1) | Al (0.05) | $LiCoO_2$ |
| --- | --- | --- | --- |
| Initial capacity (mAh) | | | |
| (25° C.) | 16.1 | 16.2 | 16.5 |
| (60° C.) | 16.3 | 16.4 | 16.8 |
| Capacity maintenance rate at the 20th cycle | | | |
| (25° C.) | 98% | 98% | 98% |
| (60° C.) | 73% | 75% | 90% |

COMPARATIVE EXAMPLE 6

A description will be made on the substitution of a part of Ni in $LiNiO_2$ with B.

A mixture composed of $LiNO_3$, $Ni(OH)_2$ and $H_3BO_3$ was heated in an oxygen stream at 650° C. The mixing ratio of the starting materials was determined by adjusting the molar ratio of Li/(B+Ni) to 1.05 with the amount of lithium excessive and the molar ratio of B/(B+Ni) to 0.05.

X-ray diffraction measurements on the heated products showed that the obtained pattern resembled the pattern of $LiNiO_2$ registered in 9-0063 of "JCPDS" and that the sample had a crystal structure similar to that of $LiNiO_2$. Since no peak due to impurities other than those resembling the pattern of $LiNiO_2$ was observed, it was believed that the heated product was a compound represented by the formula $LiNi_{1-y}B_yO_2$ (y=0.05).

A procedure similar to that of Example 1 was then followed in configuring batteries which were thereafter subjected to the charge/discharge test under the same conditions as those of Example 3. The results of the test are summarized in Table 19 below.

COMPARATIVE EXAMPLE 7

A description will be made on the substitution of a part of Ni in $LiNiO_2$ with Co.

A mixture composed of $LiNO_3$, $Ni(OH)_2$ and $Co_3O_4$ was heated in an oxygen stream at 650° C. The mixing ratio of the starting materials was determined by adjusting the molar ratio of Li/(Co+Ni) to 1.05 with the amount of lithium excessive and the molar ratio of Co/(Co+Ni) to 0.10.

X-ray diffraction measurements on the heated products revealed that the obtained patterns resembled the pattern of $LiNiO_2$ registered in 9-0063 of "JCPDS" and that the sample had a crystal structure similar to that of $LiNiO_2$. Since no peak due to impurities other than those resembling the pattern of $LiNiO_2$ was observed, it was believed that the heated product was a compound represented by the formula $LiNi_{1-y}Co_yO_2$ (y=0.10).

A procedure similar to that of Example 1 was then followed in configuring batteries which were thereafter subjected to the charge/discharge test under the same conditions as those of Example 3. The results of the test are summarized in Table 19 below.

TABLE 19

| M (y) | B (0.05) | Co (0.1) |
|---|---|---|
| Initial capacity (mAh) | | |
| (25° C.) | 20.2 | 20.3 |
| (60° C.) | 20.7 | 20.7 |
| Capacity maintenance rate at the 20th cycle | | |
| (25° C.) | 97% | 98% |
| (60° C.) | 78% | 81% |

COMPARATIVE EXAMPLE 8

A description will be made on the substitution of a part of Ni in $LiNiO_2$ with two or more elements selected from the group consisting of Al, B, Co and Mg.

$Al(NO_3)_3$, $H_3BO_3$, $Co_3O_4$ and $Mg(NO_3)_2$ were used as the sources of Al, B, Co and Mg, respectively. Each of these were mixed with $LiNO_3$ and $Ni(OH)_2$ and the obtained mixtures were heated in an oxygen stream at 650° C. The mixing ratio of the starting materials was determined by adjusting the molar ratio of Li/(Ni+(a combination of two or more elements selected from the group consisting of Al, B, Co and Mg)) to 1.05 with the amount of lithium excessive and any of Al, B, Co and Mg to the intended composition.

X-ray diffraction measurements on the heated products showed that the obtained patterns resembled the pattern of $LiNiO_2$ registered in 9-0063 of "JCPDS" and that the samples had a crystal structure similar to that of $LiNiO_2$. It was further found that any of the intensity ratios of a peak indicated by a facet index 003 to the peak indicated by a facet index 104 was 1.25 or more. No peak due to impurities other than the peaks similar to that of $LiNiO_2$ was found, and thus it was believed that each of the heated products had a composition of the compounds as listed in Table 20 below.

A procedure similar to that of Example 1 was then followed in configuring batteries which were thereafter subjected to the charge/discharge test under the same conditions as those of Example 3. The results of the test are also summarized in Table 20 below.

TABLE 20

| | Initial capacity (mAh) | | Capacity Maintenance Rate at the 20th Cycle (%) | |
|---|---|---|---|---|
| | 25° C. | 60° C. | 25° C. | 60° C. |
| $LiNi_{0.9}(Al_{0.6}Mg_{0.6})_{0.1}O_2$ | 14.2 | 14.6 | 91 | 81 |
| $LiNi_{0.9}(Al_{0.3}B_{0.1}Co_{0.3}Mg_{0.4})_{0.1}O_2$ | 14.7 | 15.0 | 91 | 86 |
| $LiNi_{0.9}((AlBCoMg)_{0.3})_{0.1}O_2$ | 14.6 | 15.1 | 92 | 86 |
| $LiNi_{0.6}(Al_{0.5}Mg_{0.5})_{0.4}O_2$ | 15.1 | 15.5 | 95 | 79 |
| $LiNi_{0.6}(Al_{0.3}Co_{0.3}Mg_{0.4})_{0.4}O_2$ | 15.2 | 15.4 | 95 | 78 |
| $LiNi_{0.6}((AlBCoMg)_{0.25})_{0.4}O_2$ | 15.1 | 15.3 | 94 | 77 |
| $LiNi_{0.995}(Al_{0.5}Mg_{0.5})_{0.005}O_2$ | 21.1 | 21.7 | 93 | 55 |
| $LiNi_{0.995}(Al_{0.3}Co_{0.3}Mg_{0.4})_{0.005}O_2$ | 21.1 | 21.7 | 93 | 54 |
| $LiNi_{0.995}((AlBCoMg)_{0.25})_{0.005}O_2$ | 21.1 | 21.6 | 92 | 54 |

COMPARATIVE EXAMPLE 9

A description will be made on the substitution of a part of Ni in $LiNiO_2$ with Al.

A mixture composed of $NiNO_3$, $Ni(OH)_2$ and $Al(NO_3)_3$ was heated in an oxygen stream at 650° C. The mixing ratio of the starting materials was determined by adjusting the molar ratio of Li/(Al+Ni) to 1.05 with the amount of lithium excessive and the molar ratio of Al/(Al+Ni) to 0.1, 0.2, 0.3, 0.4 and 0.5.

From X-ray diffraction measurements on the heated products, it was appreciated that the obtained patterns resembled the pattern of $LiNiO_2$ registered in 9-0063 of "JCPDS" and that the samples had a crystal structure similar to that of $LiNiO_2$. It was further found that any of the intensity ratios of a peak indicated by a facet index 003 for the peak indicated by a facet index 104 was 1.25 or more. Since no peak due to impurities other than the peaks similar to that of $LiNiO_2$ was found, it was believed that each of the heated products was a compound represented by the formula $LiNi_{1-y}Al_yO_2$ (y=0.1, 0.2, 0.3, 0.4 or 0.5).

A procedure similar to that of Example 1 was then followed in configuring batteries which were thereafter subjected to the charge/discharge test under the same conditions as those of Example 3. The results of the test are summarized in Table 21 below.

TABLE 21

| | | y | | | | |
|---|---|---|---|---|---|---|
| M | | 0.10 | 0.20 | 0.30 | 0.40 | 0.50 |
| Al | Initial Capacity (mAh) | | | | | |
| | (25° C.) | 20.1 | 19.8 | 19.5 | 15.3 | 12.8 |
| | (60° C.) | 20.3 | 20.2 | 19.9 | 15.6 | 13.0 |
| | Capacity Maintenance Rate | | | | | |
| | (25° C., %) | 97 | 97 | 97 | 96 | 93 |
| | (60° C., %) | 75 | 61 | 57 | 57 | 56 |

COMPARATIVE EXAMPLE 10

A description will be made on substitution of a part of Ni in $LiNiO_2$ with Co.

A mixture composed of $LiNO_3$, $Ni(OH)_2$ and $Co_3O_4$ was heated in an oxygen stream at 650° C. The mixing ratio of the starting materials was determined by adjusting the molar ratio of Li/(Co+Ni) to 1.05 with the amount of lithium excessive and the molar ratio of Co/(Co+Ni) to 0.003, 0.005, 0.01, 0.1, 0.2 and 0.3.

From X-ray diffraction measurements on the heated products, it was appreciated that the obtained patterns resembled the pattern of $LiNiO_2$ registered in 9-0063 of "JCPDS" and that the samples had a crystal structure similar to that of $LiNiO_2$. No peak due to impurities other than the peaks similar to that of $LiNiO_2$ was found, and thus it was believed that each of the heated products was a compound represented by the formula $LiNi_{1-y}Co_yO_2$ (y=0.003, 0.005, 0.01, 0.1, 0.2 or 0.3). Moreover, in the range of the quantity for substitution indicated above, the intensity ratio of a peak indicated by a facet index 003 to the peak indicated by a facet index 104 was 1.25 or more, and thus it was believed that there occurred no disorder in the crystal structure due to possible invasion of Ni or Co into the layer of Li.

A procedure similar to that of Example 1 was then followed in configuring batteries which were thereafter subjected to the charge/discharge test under the same conditions as those of Example 6. The results of the test are summarized in Table 22 below.

TABLE 22

| M | \multicolumn{6}{c}{y} |
| --- | --- | --- | --- | --- | --- | --- |
|  | 0.003 | 0.005 | 0.010 | 0.10 | 0.20 | 0.30 |
| Co Initial Capacity (mAh) | | | | | | |
| (25° C.) | 20.2 | 20.1 | 19.9 | 19.7 | 19.4 | 15.2 |
| (60° C.) | 20.4 | 20.3 | 20.0 | 19.9 | 19.5 | 15.4 |
| Capacity Maintenance Rate at the 50th Cycle | | | | | | |
| (25° C., %) | 87 | 92 | 93 | 94 | 95 | 95 |
| (60° C., %) | 60 | 62 | 65 | 66 | 66 | 67 |

In the foregoing examples, although $LiNO_3$ and $Ni(OH)_2$ are used as the raw material lithium salt and nickel salt, respectively, a similar technical advantage can also be obtained by employing lithium hydroxide, lithium carbonate and lithium oxide, and nickel carbonate, nickel nitrate and nickel oxide as the lithium salt and the nickel salt, respectively. In addition to those compounds employed in the above-mentioned examples, any of nitrates, carbonates and oxides can also be employed as the sources of the substitution elements Mg, Ca, Ba, Sr, Al, Cr, B and Co with a similar technical advantage.

As regards the materials employed for configuring the battery, a similar technical advantage can be obtained by using any of carbon materials, graphite analogous compounds, aluminum, an aluminum alloy, and the like, in addition to the metal lithium employed as the negative electrode in the above-mentioned examples, on condition that they can absorb and desorb lithium ions in a reversible manner.

In addition to the electrolyte comprising propylene carbonate as its solvent and lithium perchlorate as its solute employed in the above-mentioned examples, any of the solvents available for the lithium battery of this kind, such as ethylene carbonate, diethyl carbonate, methyl ethyl carbonate, dimethoxy ethane, tetrahydrofuran, methyl tetrahydrofuran, γ-butyrolactone, dioxorane, dimethyl sulfoxide and the like, as well as any of the lithium salt solutes, such as lithium hexafluorophosphate, lithium tetrafluoroborate, lithium trifluoromethane sulfonate and the like, can be employed with similar technical advantage. Further, in addition to the disclosed coin type battery, a similar technical advantage can be obtained with any of the cylindrical and rectangular batteries.

As clearly appreciated from the description on the preferred embodiments, according to the present invention, it is possible to provide a non-aqueous electrolyte secondary battery having a low manufacturing cost and a high energy density and being excellent in the high rate charge/discharge characteristic and in the characteristics in operation at high temperature.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A non-aqueous electrolyte lithium secondary battery comprising a positive electrode, a negative electrode capable of absorbing and desorbing lithium in a reversible manner and a non-aqueous electrolyte, wherein said positive electrode comprises a compound represented by the formula $Li_xNi_{1-y}M_yO_{2+z}$, where M represents at least one element selected from the group consisting of Mg, Ca, Sr and Ba, and $0.05 \leq x \leq 1.1$, $0.01 \leq y \leq 0.3$, and $-0.3 \leq z \leq 0.1$.

2. A non-aqueous electrolyte lithium secondary battery comprising a positive electrode, a negative electrode capable of absorbing and desorbing lithium in a reversible manner and a non-aqueous electrolyte, wherein said positive electrode comprises a compound represented by the formula $Li_xNi_{1-y}M_yO_{2+z}$, where M is Al, and $0.05 \leq x \leq 1.1$, $0.003 \leq y < 0.1$, and $-0.3 \leq z \leq 0.1$.

3. A non-aqueous electrolyte lithium secondary battery comprising a positive electrode, a negative electrode capable of absorbing and desorbing lithium in a reversible manner and a non-aqueous electrolyte, wherein said positive electrode comprises a compound represented by the formula $Li_xNi_{1-y}(Al_aB_bCo_cMg_d)_yO_{2+z}$, where $0.05 \leq x \leq 1.1$, $0.01 \leq y \leq 0.3$, $-0.3 \leq z \leq 0.1$, and $(a+b+c+d) \leq 1$, and any three or more of a, b, c and d are never 0 at the same time.

4. A non-aqueous electrolyte lithium secondary battery comprising a positive electrode, a negative electrode capable of absorbing and desorbing lithium in a reversible manner and a non-aqueous electrolyte, wherein said positive electrode comprises a compound represented by the formula $Li_{1+x-y}Al_yNiO_{2+z}$, where $-0.1 \leq x \leq 0.1$, $0.01 \leq y \leq 0.2$, and $-0.3 \leq z \leq 0.2$.

5. A non-aqueous electrolyte lithium secondary battery comprising a positive electrode, a negative electrode capable of absorbing and desorbing lithium in a reversible manner and a non-aqueous electrolyte, wherein said positive electrode comprises a compound represented by the formula $Li_{1+x-y}M_yNiO_{2+z}$, where M represents at least one element selected from the group consisting of Mg and Ca, and $-0.1 \leq x \leq 0.1$, $0.01 \leq y \leq 0.2$, and $-0.3 \leq z \leq 0.1$.

6. A non-aqueous electrolyte lithium secondary battery comprising a positive electrode, a negative electrode capable of absorbing and desorbing lithium in a reversible manner and a non-aqueous electrolyte, wherein said positive electrode comprises a compound represented by the formula $Li_{1+x-y}(Mg_aCa_bCo_cAl_d)_yNiO_{2+z}$, where $-0.1 \leq x \leq 0.1$, $0.01 \leq y \leq 0.2$, $-0.3 \leq z \leq 0.2$, and $(a+b+c+d)=1$, and any three or more of a, b, c and d are never 0 at the same time.

* * * * *